US009744969B2

(12) United States Patent
Kim

(10) Patent No.: US 9,744,969 B2
(45) Date of Patent: Aug. 29, 2017

(54) VEHICLE CONTROL APPARATUS AND METHOD FOR DRIVING SAFETY

(71) Applicant: Hyundai Motor Company, Seoul (KR)

(72) Inventor: Dong Hyuk Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/066,720

(22) Filed: Mar. 10, 2016

(65) Prior Publication Data

US 2017/0101096 A1 Apr. 13, 2017

(30) Foreign Application Priority Data

Oct. 12, 2015 (KR) ........................ 10-2015-0142217

(51) Int. Cl.
*B60W 30/16* (2012.01)
*B60W 30/18* (2012.01)
*B60W 30/08* (2012.01)

(52) U.S. Cl.
CPC ...... *B60W 30/16* (2013.01); *B60W 30/18163* (2013.01); *B60W 30/08* (2013.01); *B60W 2550/30* (2013.01)

(58) Field of Classification Search
CPC ..................................................... B60W 30/16
See application file for complete search history.

(56) References Cited

U.S. PATENT DOCUMENTS

| | | | | |
|---|---|---|---|---|
| 6,289,332 | B2 * | 9/2001 | Menig | B60K 35/00 180/167 |
| 8,681,016 | B2 * | 3/2014 | Lee | B60W 30/143 180/169 |
| 8,874,267 | B1 * | 10/2014 | Dolgov | B60W 30/00 700/253 |
| 9,180,882 | B1 * | 11/2015 | Dolgov | B60W 30/00 |
| 9,399,471 | B2 * | 7/2016 | Kim | B60W 50/0097 |
| 9,487,212 | B1 * | 11/2016 | Adam | B60W 30/143 |
| 2005/0114009 | A1 * | 5/2005 | Hellmann | B60K 31/0008 701/93 |
| 2011/0137528 | A1 | 6/2011 | Le et al. | |

FOREIGN PATENT DOCUMENTS

| | | | |
|---|---|---|---|
| JP | 2003-237407 | A | 8/2003 |
| JP | 2006-176062 | A | 7/2006 |
| JP | 2006-315491 | A | 11/2006 |
| JP | 2010-043960 | A | 2/2010 |
| JP | 4419769 | B2 | 2/2010 |
| JP | 2010-238053 | A | 10/2010 |
| KR | 2013-0143272 | A | 12/2013 |
| KR | 10-1361360 | B1 | 2/2014 |
| KR | 2015-0026203 | A | 3/2015 |
| KR | 2015-0072942 | A | 6/2015 |

* cited by examiner

*Primary Examiner* — Adam Tissot
*Assistant Examiner* — Michael Berns
(74) *Attorney, Agent, or Firm* — Mintz Levin Cohn Ferris Glovsky and Popeo, P.C.; Peter F. Corless

(57) ABSTRACT

A method for controlling a vehicle is provided with a smart cruise control (SCC) system. The vehicle determines whether a neighboring vehicle sensed by a blind spot detection (BSD) device meets a particular condition. When the neighboring vehicle meets the particular condition, the speed of the vehicle is adjusted based on a comparison result between the vehicle speed and neighboring vehicle speed.

20 Claims, 9 Drawing Sheets

VEHICLE CONTROL APPARATUS AND METHOD FOR DRIVING SAFETY

CROSS-REFERENCE TO RELATED APPLICATION

This application claims priority to and the benefit of Korean Patent Application No. 10-2015-0142217, filed on Oct. 12, 2015 in the Korean Intellectual Property Office, the disclosure of which is hereby incorporated by reference as if fully set forth herein.

TECHNICAL FIELD

The disclosure relates to an apparatus and a method for controlling a vehicle, and more particularly, to an apparatus and a method that prevent user inconvenience caused by other vehicles operating adjacently when the vehicle is autonomously operated by a smart cruise control system (SCC).

BACKGROUND

Recently, advanced driver assistance systems (ADAS) that use high-technology detection sensors and intelligent video systems for use in a vehicle have been developed to provide useful functions such as forward or rear collision warning, lane departure warning, blind spot detection, collision avoidance, and the like. The advanced driver assistance systems (ADAS) are systems that help a driver in the driving process during dangerous scenarios and sense danger risks via detectors or sensors and provide accident warnings by visual, audible, vibrating or tactile output devices. These advanced driver assistance systems (ADAS) provide warnings to drivers and also are being developed with vehicle control systems for autonomous vehicle control.

For example, a smart cruise control (SCC) system has been developed which is a type of cruise control system for road vehicles that automatically adjusts the vehicle speed to maintain a safe distance from vehicles traveling ahead of the subject vehicle. In response to the location of proceeding vehicles, the distance from the proceeding vehicles, or the like detected by forward sensors mounted within the vehicle, the smart cruise control (SCC) system autonomously operates a throttle valve, a brake, or a transmission to automatically adjust the vehicle speed to maintain pace with the vehicles in front of the driver. Further, the smart cruise control (SCC) system performs cruise controls which automatically adjust the speed of a vehicle when there are no vehicles traveling ahead of the subject vehicle. However, when a proceeding vehicle is detected, the smart cruise control (SCC) system maintains a safe distance from the proceeding vehicle.

SUMMARY

The present invention provides an apparatus and a method for use in a vehicle that avoid a specific situation (referred as to "parallel driving") in which, when driving on a multi-lane road, the vehicle blocks other traffic by driving right or left next to another vehicle at the substantially same speed while a driver drives on cruise control. Further, while a vehicle is driven on cruise control, an apparatus and a method for use in a vehicle including the smart cruise control (SCC) system may be configured to detect a parallel driving and automatically adjust the vehicle speed to escape from the parallel driving to reduce risks of dangers or accidents.

A method is provided for controlling a vehicle including a smart cruise control (SCC) system. In the method, the vehicle may be driven by a smart cruise control (SCC) system. A blind spot detection (BSD) device may be configured to detect neighboring vehicles. Whether the neighboring vehicle meets a particular condition may be determined and when the neighboring vehicle meets the particular condition, the speed of the subject vehicle may be adjusted based on a comparison result between the subject vehicle speed and neighboring vehicle speed. The method may further include determining whether the subject vehicle speed is the same as or greater than a reference speed.

The particular condition to be met by neighboring vehicles may include a first condition regarding a distance between the subject vehicle and the neighboring vehicle and a second condition regarding a relative velocity between the subject vehicle and the neighboring vehicle. The first condition may be met when the distance between the vehicles is less than about 4 meters, while the second condition may be satisfied when the relative velocity between the vehicles is less than about ±3 km/h. The particular condition may further include a third condition that the first and second conditions are maintained over at least 1 second.

Further, to adjust the speed of the subject vehicle, when the speed of the subject vehicle is greater than the neighboring vehicle speed, a controller may be configured to increase the subject vehicle speed and decrease the vehicle speed when the subject vehicle speed is less than the neighboring vehicle speed. The vehicle speed may be adjusted by about 2 km/h at a time.

The method may further include reinstating the vehicle speed when an abort condition is met. The abort condition may include at least one of a first abort condition in which the neighboring vehicle is over at least 10 meters away from the subject vehicle (e.g., traveling vehicle), a second abort condition in which a distance between the neighboring vehicle and the subject vehicle is greater than a safe distance from vehicles ahead or behind (e.g., proceeding or preceding vehicles), which may be predetermined by the smart cruise control (SCC) system, and a third abort condition in which the adjustment of vehicle speed is continuously performed over at least 5 seconds.

Additionally, the method may include recognizing a type of neighboring vehicle when the neighboring vehicle meets the particular condition. Further, when the height of neighboring vehicle is greater a predetermined range, the method may include determining or classifying the neighboring vehicle as a commercial vehicle, and ceasing acceleration of the subject vehicle.

An apparatus for controlling a vehicle may be provided with a smart cruise control (SCC) system. The apparatus may include a controller configured to adjust the subject vehicle speed based on the smart cruise control (SCC) system, a blind spot detection (BSD) device configured to detect neighboring vehicles located adjacent to the subject vehicle, and a parallel driving determination unit configured to instruct the controller to adjust the vehicle speed based on a comparison result between the subject vehicle speed and neighboring vehicle speed when the neighboring vehicle meets a particular condition.

The parallel driving determination unit may be configured to determine whether the neighboring vehicle meets the particular condition when the subject vehicle speed is equal to or greater than a reference speed based on vehicle location. The particular condition may include at least one of a first condition regarding a distance between the subject vehicle and the neighboring vehicle, a second condition regarding a relative velocity between the subject vehicle and the neighboring vehicle, and a third condition that the first and second conditions are maintained over at least 1 second.

The parallel driving determination unit may be configured to increase the vehicle speed when the subject vehicle speed is greater than the neighboring vehicle speed, while decreasing the vehicle speed when the subject vehicle speed is less than the neighboring vehicle speed. Further, the parallel driving determination unit may be configured to reinstate the subject vehicle speed when an abort condition is met.

The abort condition may include at least one of a first abort condition in which the neighboring vehicle is over at least 10 meters away from the subject vehicle, a second abort condition in which a distance between the neighboring vehicle and the subject vehicle is over a safe distance from vehicles ahead or behind the subject vehicle (e.g., proceeding and preceding vehicles), which may be predetermined by the smart cruise control (SCC) system, and a third abort condition in which the adjustment of subject vehicle speed is continuously performed over at least 5 seconds.

The apparatus may further include a vehicle model recognition unit configured to recognize a type of neighboring vehicle when the neighboring vehicle meets the particular condition. When the height of the neighboring vehicle is greater than a predetermined range, the controller may be configured to terminate acceleration of the subject vehicle.

An apparatus for controlling a vehicle including a smart cruise control (SCC) system may include a processing system that comprises at least one data processor and at least one computer-readable memory storing a computer program. The processing system may be configured to operate the apparatus to drive on the smart cruise control (SCC) system, determine whether the subject vehicle speed is equal to or greater than a reference speed based on vehicle location, determine whether a neighboring vehicle sensed by a blind spot detection (BSD) device meets a particular condition, and adjust the vehicle speed based on a comparison result between the subject vehicle speed and neighboring vehicle speed when the neighboring vehicle meets the particular condition.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

Figure 1B:
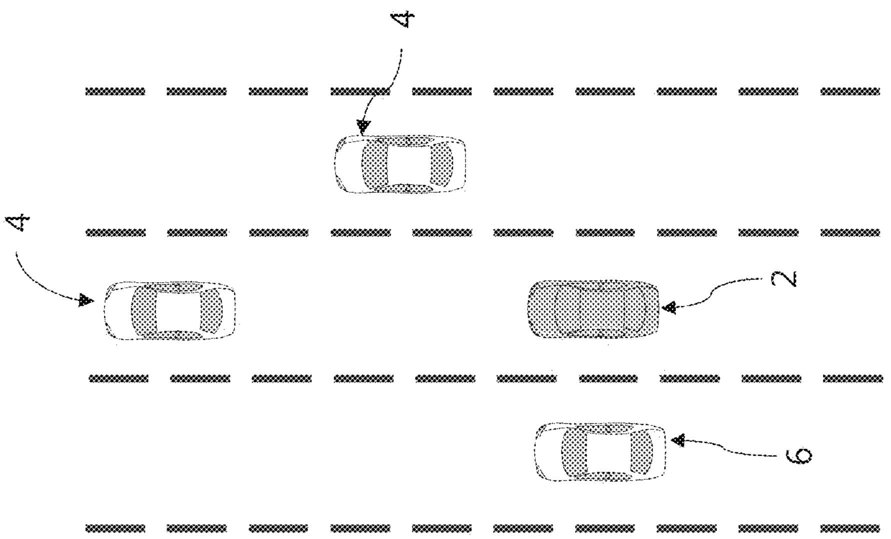
FIGS. 1A-1B show a parallel driving happened when a vehicle is on smart cruise control (SCC) according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the invention, examples of which are illustrated in the accompanying drawings. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions. The term "coupled" or "operatively coupled" as used herein, is defined as connected, although not necessarily directly, and not necessarily mechanically.

In the description of the invention, certain detailed explanations of related art are omitted when it is deemed that they may unnecessarily obscure the essence of the invention. The features of the invention will be more clearly understood from the accompanying drawings and should not be limited by the accompanying drawings. It is to be appreciated that all changes, equivalents, and substitutes that do not depart from the spirit and technical scope of the invention are encompassed in the invention.

Figure 1A:
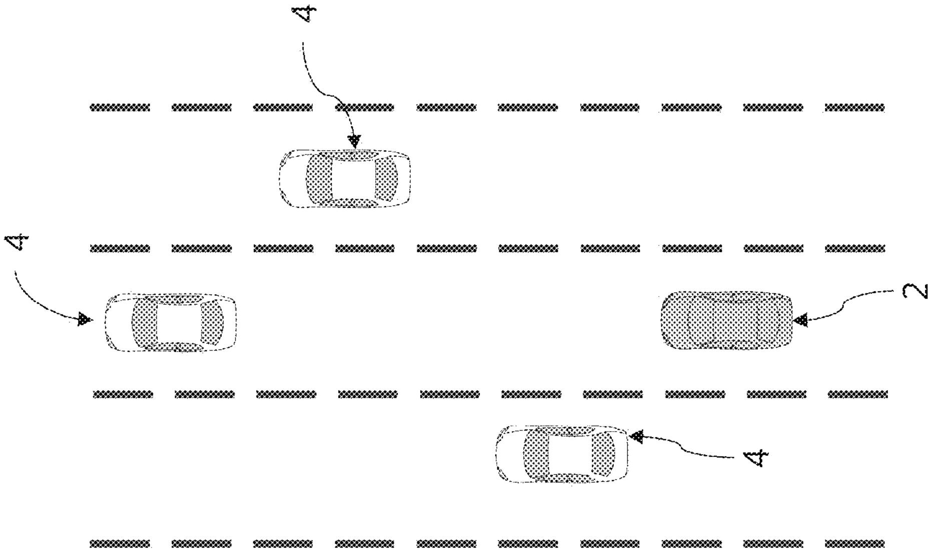

FIGS. 1A-1B show a parallel driving occurring when a vehicle is on smart cruise control (SCC). Particularly, FIG. 1A, shows a general traffic situation when the vehicle is driver operated, while FIG. 1B describes the parallel driving which may occur when the vehicle is operating under smart cruise control (SCC).

Referring to FIG. 1A, a vehicle 2 (e.g., a subject or traveling vehicle) may be driven on a particular lane (e.g., a second lane on the left), while neighboring vehicles 4 may be traveling on any one of lanes in the same direction as the subject vehicle 2. For driving safety, drivers (or passengers) of the subject vehicle 2 and the neighboring vehicles 4 drive the vehicles away from each other. Since a drive may both select one of the lanes as well as adjust vehicle speed, the subject vehicle 2 may be driven to maintain a particular distance from the neighboring vehicles 4.

Referring to FIG. 1B, when the subject vehicle 2 is being driven under smart cruise control (SCC), the subject vehicle 2 may be driven to maintain a predetermined distance (e.g., a distance which prevents impact with neighboring vehicles and reducing accident risks) from the neighboring vehicle 4 traveling ahead of the subject vehicle (e.g., proceeding the subject vehicle) on the same lane. While the smart cruise control (SCC) systems may be configured to automatically adjust the vehicle speed to maintain a safe distance from the neighboring vehicle 4 (e.g., a first neighboring vehicle 4), the smart cruise control (SCC) systems may not consider another neighboring vehicle 6 (e.g., a second neighboring vehicle 6) operating in parallel with the subject vehicle 2 since the neighboring vehicle 6 is driven on a different lane.

Accordingly, regardless of a driver intent, while the subject vehicle 2 is on cruise control, the subject vehicle 2 driving on a multi-lane road may block other traffic by driving right or left next to the neighboring vehicle 6 at the substantially same speed. Further, after the subject vehicle 2 operates in parallel with the neighboring vehicle 6, these situation (called as parallel driving) may be continuously maintained by the smart cruise control (SCC) systems unless there are obstacles ahead (e.g., vehicles ahead on the same lane, or the like).

When the subject vehicle 2 continuously operates in parallel with a neighboring vehicle, possibility of an accident such as side collision, i.e., vehicle crashes where the side of one or more vehicles is impacted, may be high, and emergency handling or defensive driving may be difficult. For driver safety, blocking other traffic by driving next to another vehicle at the same speed when driving on a multi-lane road, or overtaking and passing another vehicle proceeding in the same direction, may be regulated by law or regulation every jurisdiction where the vehicle operates.

Figure 2:
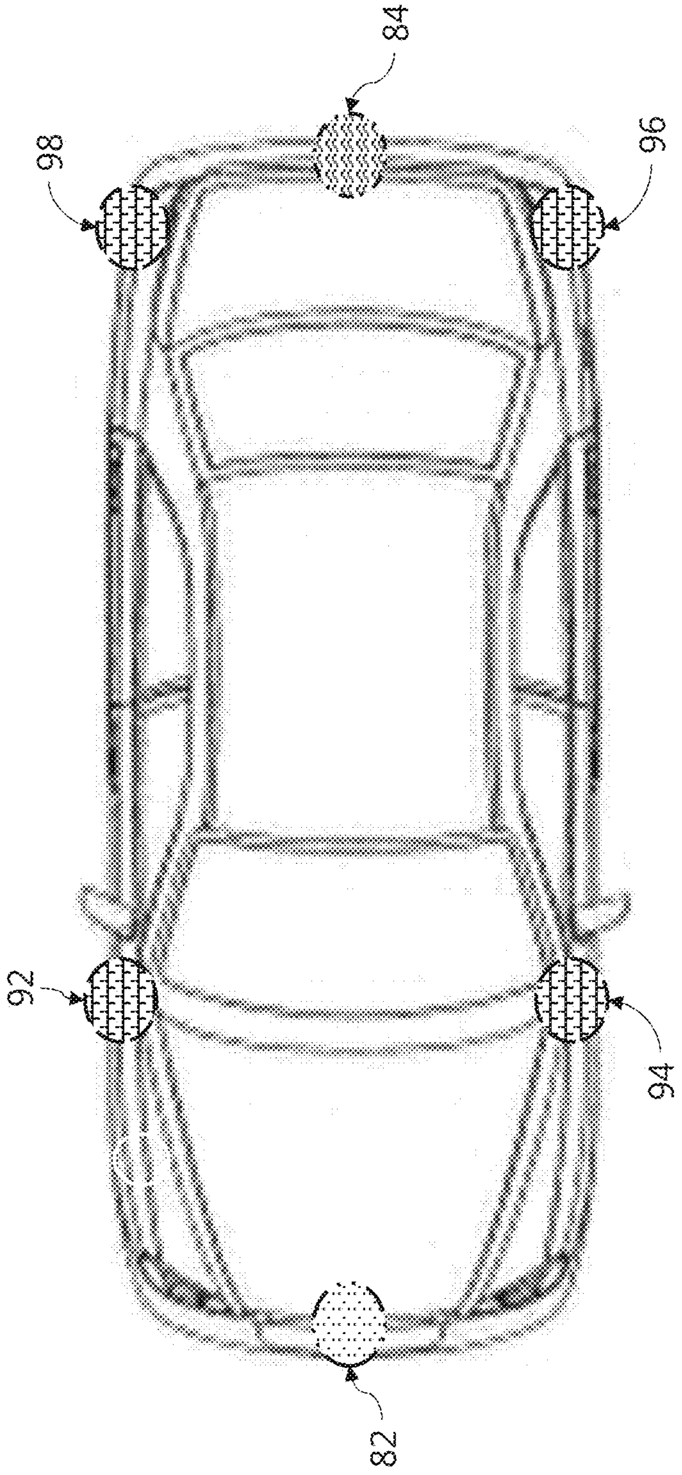
FIG. 2 describes advanced driver assistance systems (ADAS) mounted within a vehicle according to an exemplary embodiment of the present invention.

Furthermore, FIG. 2 describes advanced driver assistance systems (ADAS) mounted within a vehicle. As shown, a vehicle may include a plurality of sensors 82, 84, 92, 94, 96, 98. The plurality of sensors 82, 84, 92, 94, 96, 98 may be used for systems of forward collision warning (FCW), rear collision warning (RCW), blind spot detection (BSD), and the like. Herein, the plurality of sensors 82, 84, 92, 94, 96, 98 for systems of forward collision warning (FCW), rear collision warning (RCW), blind spot detection (BSD), and etc. may be included selectively.

By way of example, the smart cruise control (SCC) system may use a forward collision warning (FCW) system to maintain a safe distance from proceeding vehicles. The forward collision warning (FCW) system may be configured to detect vehicles traveling ahead of the subject vehicle (or obstacles) to either provide a visual, audible, vibrating or tactile warning to the driver in response to determining an imminent collision or the system may be configured to take action autonomously without any driver input (e.g., by braking or steering or both).

The vehicle may include the forward collision warning (FCW) system as well as a rear collision warning (RCW) system using a rear sensor. The rear collision warning (RCW) system may be configured to detect vehicles traveling behind the subject vehicle (or obstacles) to either provide a visual, audible, vibrating or tactile warning to the driver in response to determining an imminent collision or the system may be configured to take action autonomously without any driver input (e.g., by braking or steering or both)

Further, the vehicle may include a blind spot detection (BSD) system using side sensors 92, 94, 96, 98. The blind spot detection (BSD) system may include a vehicle-based sensor device configured to detect other vehicles located to the driver's side and rear or in a blind spot to provide information regarding detected vehicles. The blind spot detection (BSD) system is a type of safety device for preventing an accident when a driver changes a lane without cognizance about other vehicles located adjacently, when another vehicle is approaching too close to the vehicle, or the like. Further, the blind spot detection (BSD) system may be used to detect a parallel driving while the vehicle is on smart cruise control (SCC). When the parallel driving occurs, the vehicle speed may be increased or decreased to avoid the parallel driving.

Figure 3:
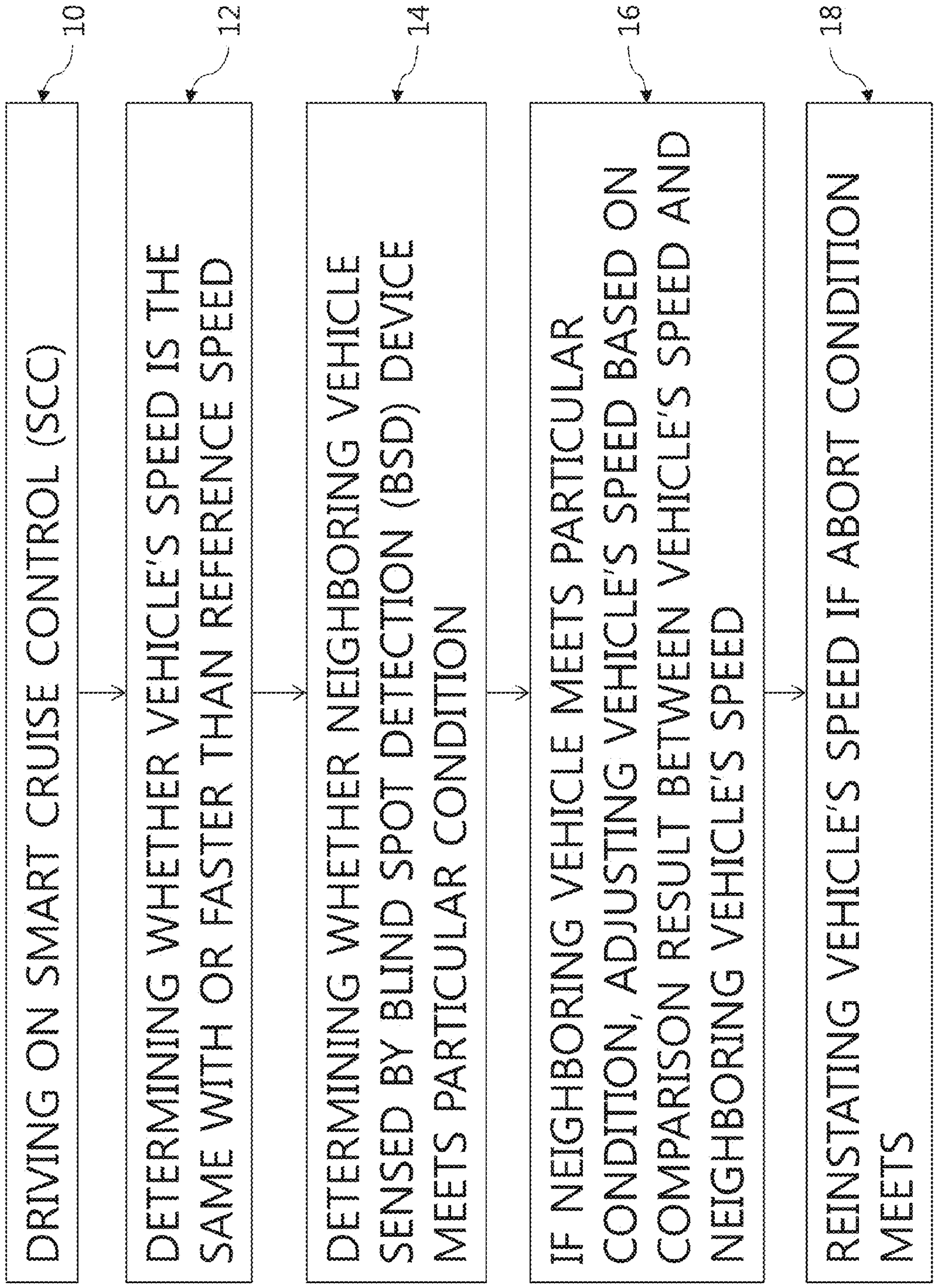
FIG. 3 shows a first vehicle control method using smart cruise control (SCC) systems according to an exemplary embodiment of the present invention.

FIG. 3 shows a first vehicle control method using smart cruise control (SCC) systems. As shown, the first vehicle control method using the smart cruise control (SCC) systems may be provided while a vehicle is being operated on smart cruise control (SCC) (step 10). In the first vehicle control method, a controller may be configured to determine whether a neighboring vehicle sensed by a blind spot detection (BSD) device meets a particular condition (step 14). When the neighboring vehicle meets the particular condition, the subject vehicle (e.g., the controller within the vehicle) may be configured to adjust the vehicle speed based on a comparison result between the subject vehicle speed and neighboring vehicle speed (step 16).

It may be assumed that the vehicle is driven by the smart cruise control (SCC) systems (step 10). When the vehicle is not operated autonomously by the smart cruise control (SCC) systems, a driver may adjust the vehicle speed to avoid parallel driving. Accordingly, when the driver manually operates the vehicle, the first vehicle control method for autonomously adjusting vehicle speed may be omitted.

Further, the first vehicle control method may include determining whether the subject vehicle speed is equal to or greater than a reference speed (step 12). By way of example, the reference speed may be about 60 km/h, but is not limited thereto. The smart cruise control (SCC) systems supports that the vehicle may generally operate up to a speed limit based on vehicle location or a type of driving road. However, when subject vehicle speed is less than the reference speed (e.g., about 60 km/h) even when the vehicle is operated autonomously by the smart cruise control (SCC) systems, the vehicle may be determined to traveling on a congested road.

In this situation, even when the vehicle speed is adjusted to avoid parallel driving with a neighboring vehicle (e.g., a first neighboring vehicle), the vehicle may operate in parallel with another neighboring vehicle (e.g., a second neighboring vehicle). In other words, when a road is determined to be congested (e.g., traffic is detected on the road), parallel driving may be difficult to avoid, and an accident risk may increase when a driver operates a vehicle by constraint. However, when the vehicle operates in parallel with other vehicles on a highway, a speedway, or etc. in which vehicles may be driven at a speed greater than a predetermined speed (e.g., about 60 km/h) generally, parallel driving may increase an accident risk and driver's (or passenger's) inconvenience. Accordingly, the first vehicle control method to avoid the parallel driving may be performed when the vehicle is driven at a speed greater than about 60 km/h.

When a speed of vehicle driven by the smart cruise control (SCC) systems is greater than the reference speed, the vehicle (e.g., the vehicle controller) may be configured to detect neighboring vehicles using the blind spot detection (BSD) system and determine whether detected neighboring vehicles meet a particular condition (step 14). The vehicle using sensors for the blind spot detection (BSD) system may be configured to detect a neighboring vehicle, or the approach of a neighboring vehicle, at adjacent spaces (e.g., driver's side and rear), recognize a distance between the subject vehicle and the neighboring vehicle as well as estimate the relative velocity, i.e., neighboring vehicle speed in the rest frame of the subject vehicle.

Herein, the particular condition may include a first condition regarding the distance between the subject vehicle and the neighboring vehicle and a second condition regarding the relative velocity between the subject vehicle and the neighboring vehicle. By way of example, the first condition may involve a distance of less than about 4 meters between the vehicles, the second condition may involve relative velocity of less than about ±3 km/h. The combination of first and second conditions may be considered a threshold for recognizing whether a neighboring vehicle is traveling at a similar speed on the next lane while the subject vehicle is being driven.

Further, the particular condition may include a third condition in which the first and second conditions are maintained over at least 1 second. When a relatively short distance and a similar relative velocity is maintained between the subject vehicle and the neighboring vehicle over a predetermined period of time throughout the blind spot detection (BSD) system, the vehicle may be configured to determine that the subject vehicle and the neighboring vehicle drive in parallel with each other. Otherwise, when the short distance and the similar relative velocity between the vehicle and the neighboring vehicle are merely maintained for a short period of time (e.g., about 0.1 or 0.5 second), the speed of the neighboring vehicle may decrease or increase. When the first and second conditions meet in a moment under a road condition or driving circumstance, it might be unnecessary that the vehicle would slow down or speed up.

In the step 16 of adjusting the speed of the subject vehicle, the vehicle speed may increase when the subject vehicle speed is greater than the neighboring vehicle speed. Further, the vehicle may slow down when the subject vehicle speed is less than the neighboring vehicle speed. By way of example, the subject vehicle speed may be adjusted (e.g., increased or decreased) by about 2 km/h at a time (e.g., per interval).

The first vehicle control method may further include reinstating, by the controller, the vehicle speed when an abort condition is met (step 18). Herein, the abort condition may include at least one of a first abort condition in which the neighboring vehicle is over at least 10 meters away from the subject vehicle, a second abort condition in which a distance between the neighboring vehicle and the subject vehicle is greater than a safe distance from vehicles ahead or behind (e.g., preceding or proceeding vehicle), which may be predetermined by the smart cruise control (SCC) systems, and a third abort condition in which the adjustment of vehicle speed is continuously performed over at least 5 seconds.

In response to determining that the subject vehicle is being driven in parallel with the neighboring vehicle, the vehicle may slow down by about 2 km/h in 5 seconds. After the 5 seconds, the subject vehicle speed may be reinstated to an original speed or a previous speed (i.e., increase by about 2 km/h). However, when having decreased the speed for 5 seconds, the vehicle may avoid operating in parallel with the neighboring vehicle (i.e., parallel driving). Even when the vehicle speed is reinstated, the vehicle may no longer operate in parallel with the neighboring vehicle.

Figure 4:
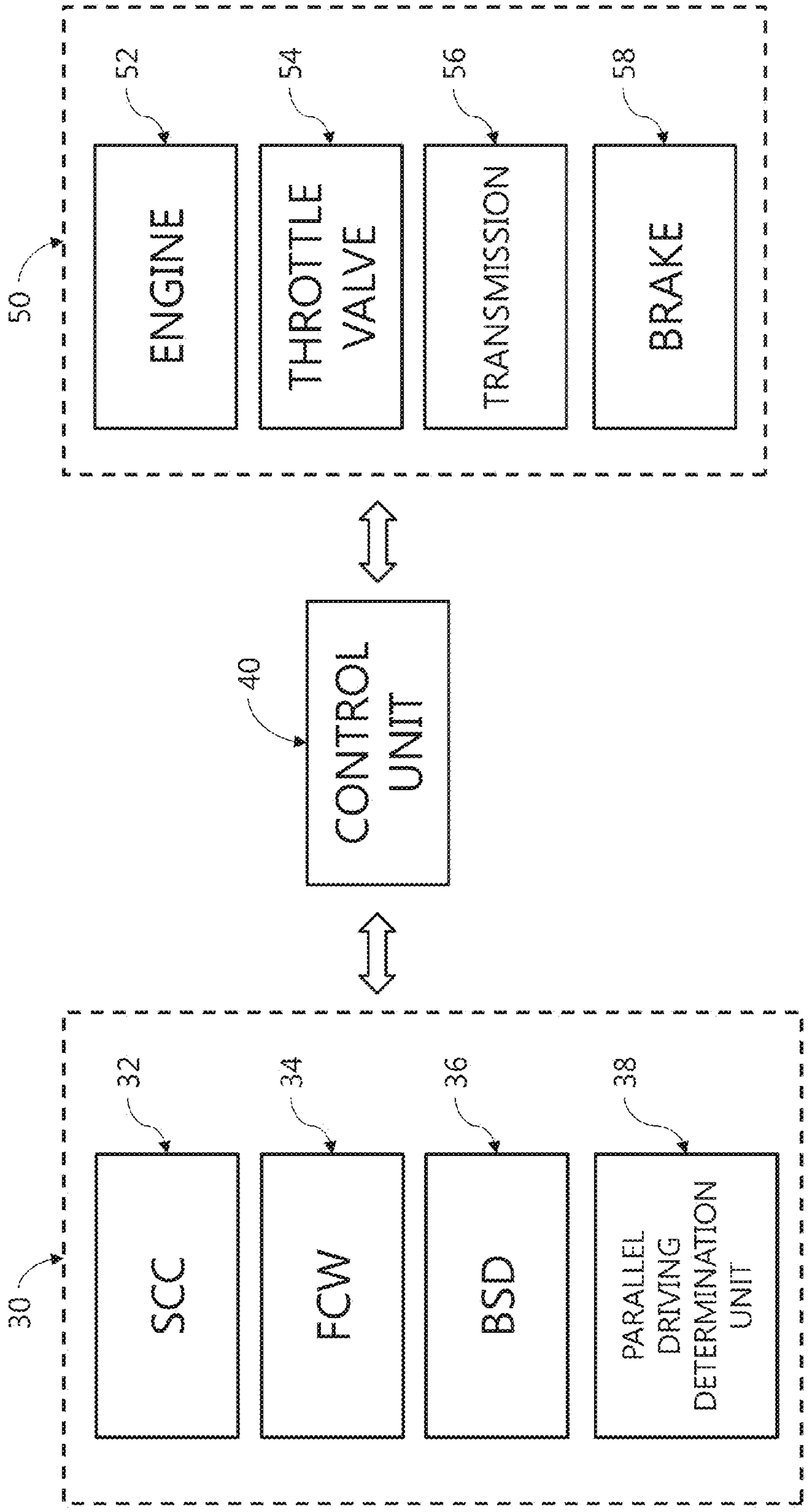
FIG. 4 shows a first vehicle control apparatus using smart cruise control (SCC) systems according to an exemplary embodiment of the present invention.

FIG. 4 shows a first vehicle control apparatus using smart cruise control (SCC) systems. As shown, the first vehicle control apparatus may be provided for controlling a vehicle including a smart cruise control (SCC) system 32. The first vehicle control apparatus may include a controller 40, a blind spot detection (BSD) device 36, and a parallel driving determination unit 38. The controller 40 may be configured to adjust vehicle speed based on the smart cruise control (SCC) system 32. The blind spot detection (BSD) device 36 may be configured to detect neighboring vehicles located adjacent to the vehicle. The parallel driving determination unit 38 may be configured to instruct the controller 40 to adjust the vehicle speed based on a comparison result between the subject vehicle speed and neighboring vehicle speed when the neighboring vehicle meets a particular condition.

The vehicle may further include a driving block 50 operated by the controller 40 and may include a plurality of devices or systems affecting vehicle speed such as an engine 52, a throttle valve 54, a transmission 56, a brake 58, or the like. Further, the in-vehicle electric system 30 may include the smart cruise control (SCC) system 32 and a forward collision warning (FCW) device 34, and etc. As not shown in FIG. 4, a rear collision warning (RCW) device, and the like may be included.

When the subject vehicle speed is equal to or greater than a reference speed, the parallel driving determination unit 38 may be configured to determine whether the neighboring vehicle meets the particular condition based on the location of the subject vehicle. The particular condition may include a first condition regarding a distance between the subject vehicle and the neighboring vehicle and a second condition regarding a relative velocity between the subject vehicle and the neighboring vehicle. The first condition may be met when the distance is less than about 4 meters, while the second condition may be satisfied when the relative velocity is less than about ±3 km/h. In addition, the particular condition may include a third condition in which the first and second conditions are maintained over at least 1 second.

The parallel driving determination unit 38 may be configured to speed up the vehicle when the subject vehicle speed is greater than the neighboring vehicle speed, while slowing down the vehicle when the subject vehicle speed is less than the neighboring vehicle speed. The subject vehicle speed may be increased or decreased by about 2 km/h at a time (e.g., per interval).

The parallel driving determination unit 38 may further be configured to reinstate the vehicle speed when an abort condition is met. Herein, the abort condition may include at least one of a first abort condition in which the neighboring vehicle is over at least 10 meters away from the subject vehicle, a second abort condition in which a distance between the neighboring vehicle and the subject vehicle is greater a safe distance from vehicles ahead or behind (e.g., preceding or proceeding vehicles), which may be predetermined by the smart cruise control (SCC) system, and a third abort condition in which the adjustment of vehicle speed is continuously performed over at least 5 seconds.

Figure 5:
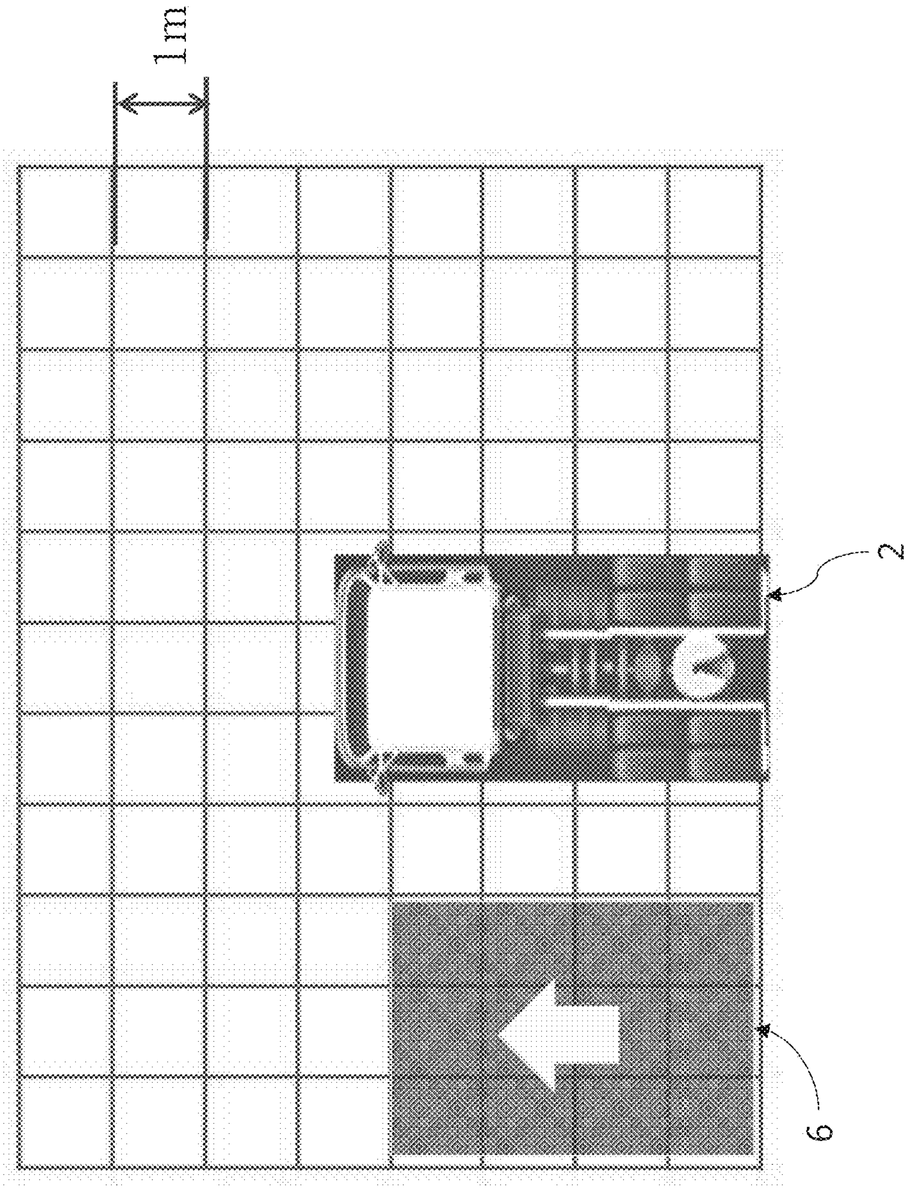
FIG. 5 describes how imaging devices mounted within a vehicle are used to detect a relative velocity of neighboring vehicles according to an exemplary embodiment of the present invention.

FIG. 5 describes how imaging devices (e.g., cameras, video cameras, etc.) mounted within a vehicle may be used to detect a relative velocity of neighboring vehicles. As shown, the vehicle 2 may use in-vehicle imaging devices, e.g., cameras or sensors (92, 94 shown in FIG. 2) mounted in side mirrors to detect a neighboring vehicle being driven on the next lane (e.g., an adjacent lane). When a neighboring vehicle 6 is detected in the next lane, the vehicle 2 (e.g., vehicle controller) may be configured to detect location of neighboring vehicle 6 in real time using the imaging devices. The vehicle 2 may further be configured to measure the relative velocity based on movement of the neighboring vehicle 6 within a space including a virtual grid including plural squares of 1 $m^2$. When the neighboring vehicle 6 moves 1 meter, the relative velocity may be determined using the following equation.

$$\text{Relative Velocity (m/s)}=1\text{ (m)/Time for moving (sec)}$$

Figure 6B:
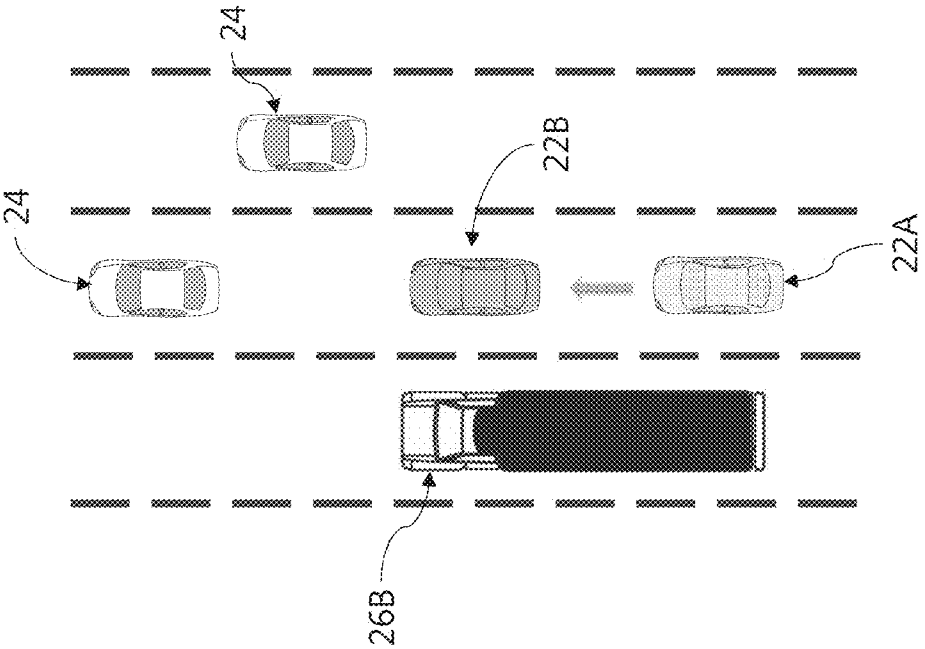
FIGS. 6A-6B show another example of parallel driving occurring when a vehicle is on smart cruise control (SCC) according to an exemplary embodiment of the present invention.
Figure 6A:
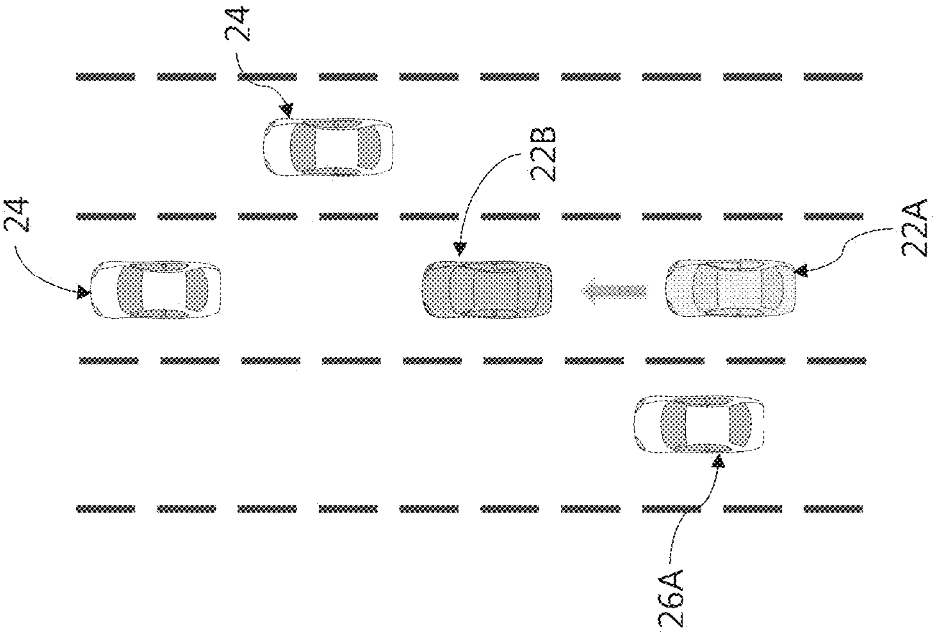

FIGS. 6A-6B show another example of parallel driving occurring when a vehicle is under smart cruise control (SCC). Particularly, FIG. 6A describes a parallel driving with a general automobile 26A when the vehicle 22A, 22B is driven by smart cruise control (SCC) systems, while FIG. 6B describes another parallel driving with a lorry 26B (e.g., a truck) having a greater length than the general automobile 26A.

Referring to FIG. 6A, the vehicle 22A (e.g., a first vehicle) while driven on a particular lane by the smart cruise control (SCC) systems may be configured to detect neighboring vehicles 24, 26A traveling on different lanes respectively. When the vehicle speed increases as the vehicle 22A (e.g., the first vehicle) travels in parallel with the neighboring vehicle 26A, the vehicle 22B (e.g., a second vehicle) (moved at an increased speed from the location of vehicle 22A) may be at least a predetermined distance from the neighboring vehicle 26A to prevent the vehicle 22B from being driven in parallel with the neighboring vehicle 26A.

Referring to FIG. 6B, the vehicle 22A (e.g., the first vehicle) while driven by the smart cruise control (SCC) systems may operate in parallel with a commercial vehicle such as the lorry 26B. In particular, even when the vehicle 22A speed increases to move to the location of vehicle 22B (e.g., the second vehicle), the vehicle 22B may still operate in parallel with the lorry 26B since the lorry 26B has a greater length than the neighboring vehicle 26A shown in FIG. 6A. Accordingly, when a neighboring vehicle detected by the vehicle 22A is a type of commercial vehicle such as the lorry 26B, increasing the vehicle 22A speed might have minimal effect on avoiding a parallel driving.

Figure 7A:
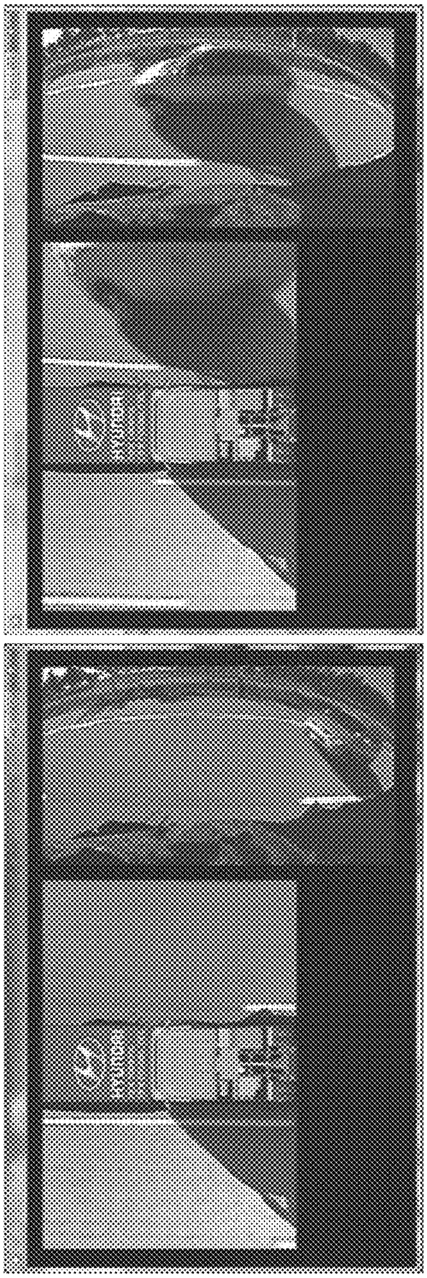
FIGS. 7A-7B show neighboring vehicles detected by an imaging device mounted within a vehicle according to an exemplary embodiment of the present invention.
Figure 7B:
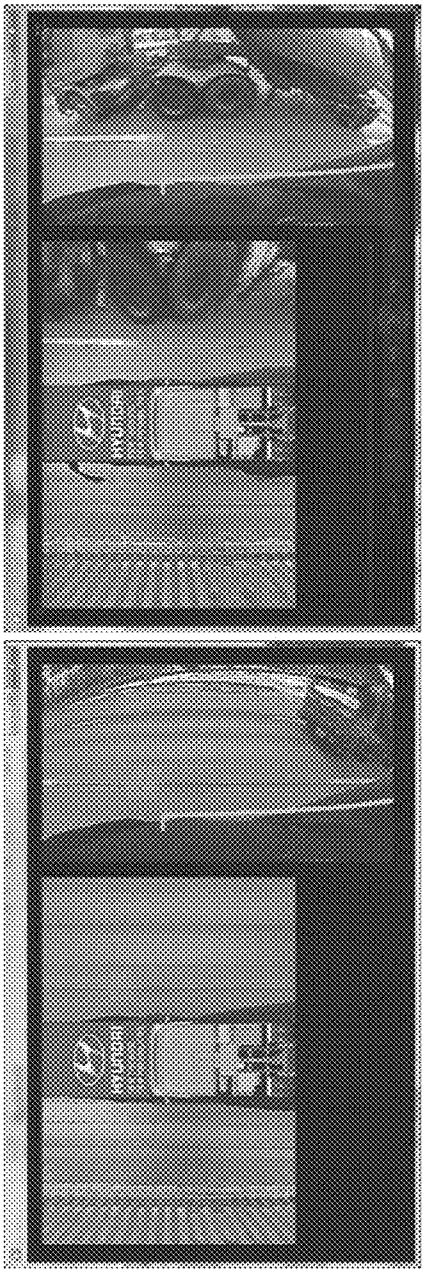

FIGS. 7A-7B show neighboring vehicles detected by an imaging device mounted within a vehicle. As shown, FIG. 7A is a situation when imaging devices recognize a neighboring vehicle (e.g., which does not have a long length, such as a private vehicle), while FIG. 7B is a situation when the imaging devices detect another neighboring vehicle which is a type of lorry having a long length (e.g., a greater length than a vehicle).

To distinguish two different types of vehicles, i.e., a private vehicle or sedan (e.g., general vehicles) and a commercial vehicle (e.g., lorries), the vehicle may use the height of neighboring vehicles captured by imaging devices. When the height of neighboring vehicles is greater than a predetermined range, the neighboring vehicles may be classified as a commercial vehicle such as lorry. For example, since a sedan shown in FIG. 7A and a lorry shown in FIG. 7B may have different heights referring to FIGS. 7A-7B, the vehicle may be configured to determine a type of detected vehicles based on the height of detected vehicles.

Figure 8:
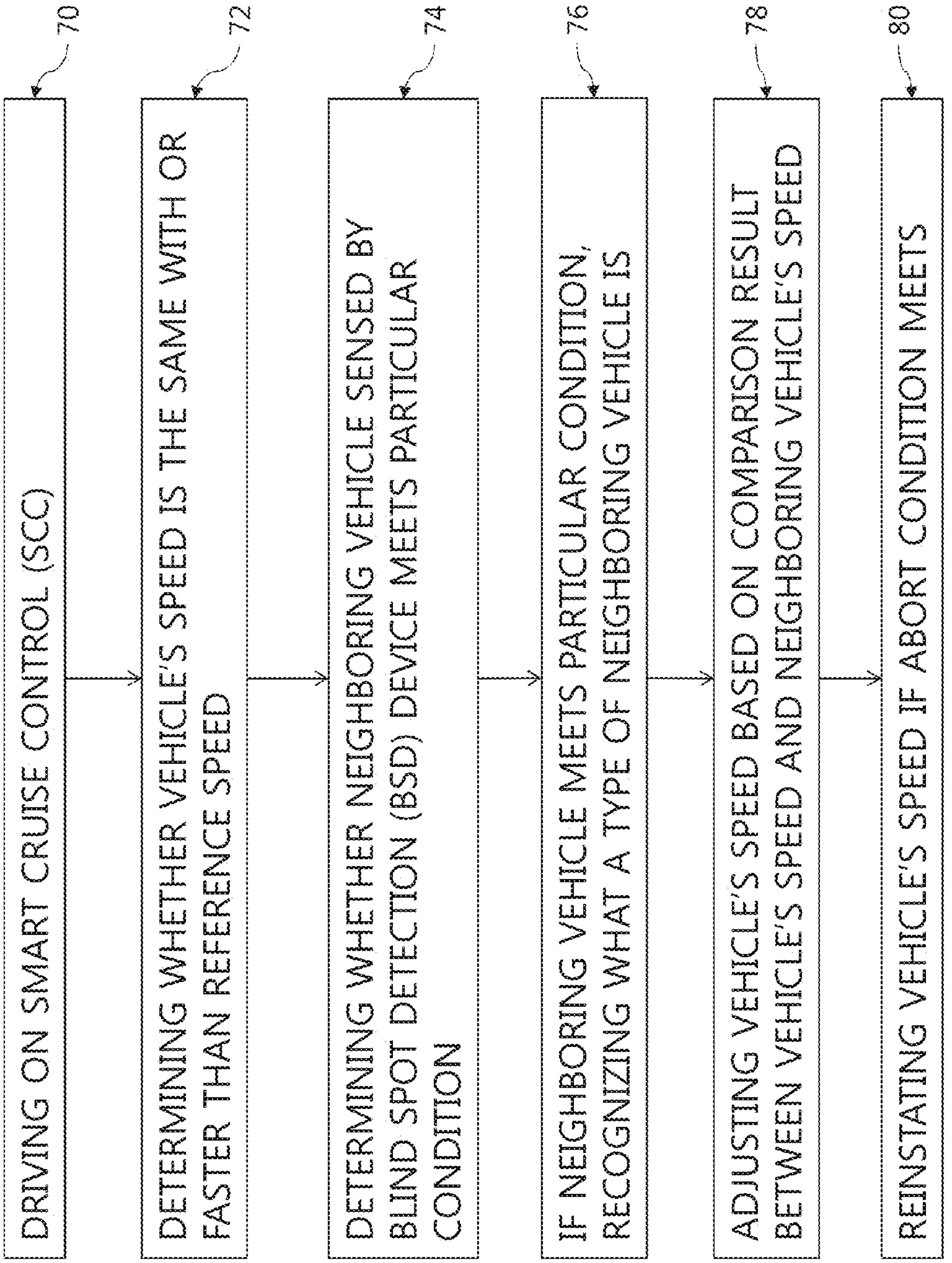
FIG. 8 shows a second vehicle control method using smart cruise control (SCC) systems according to an exemplary embodiment of the present invention.

FIG. 8 shows a second vehicle control method using smart cruise control (SCC) systems. As shown, the second vehicle control method using the smart cruise control (SCC) systems may be provided while a vehicle is driven on smart cruise control (SCC) (step 70). The vehicle may be configured to determine whether a neighboring vehicle detected by a blind spot detection (BSD) device meets a particular condition (step 74). When the neighboring vehicle meets the particular condition, the vehicle may be configured to recognize a type of detected neighboring vehicle (step 76). Based on a comparison result between the subject vehicle speed and neighboring vehicle speed and the type of neighboring vehicle, the subject vehicle may be configured to adjust the vehicle speed (step 78).

In addition, the second vehicle control method may include determining whether the subject vehicle speed is equal to or greater than a reference speed (step 72). The second vehicle control method may further include reinstating the vehicle speed when an abort condition is met (step 80). Though the second vehicle control method is similar to the first vehicle control method shown in FIG. 3, the second vehicle control method may further include recognizing a type of neighboring vehicle. As not shown in FIG. 8, when the neighboring vehicle height is greater than a predetermined range, the vehicle may consider or classify the neighboring vehicle as a commercial vehicle, and cease acceleration of vehicle speed.

Figure 9:
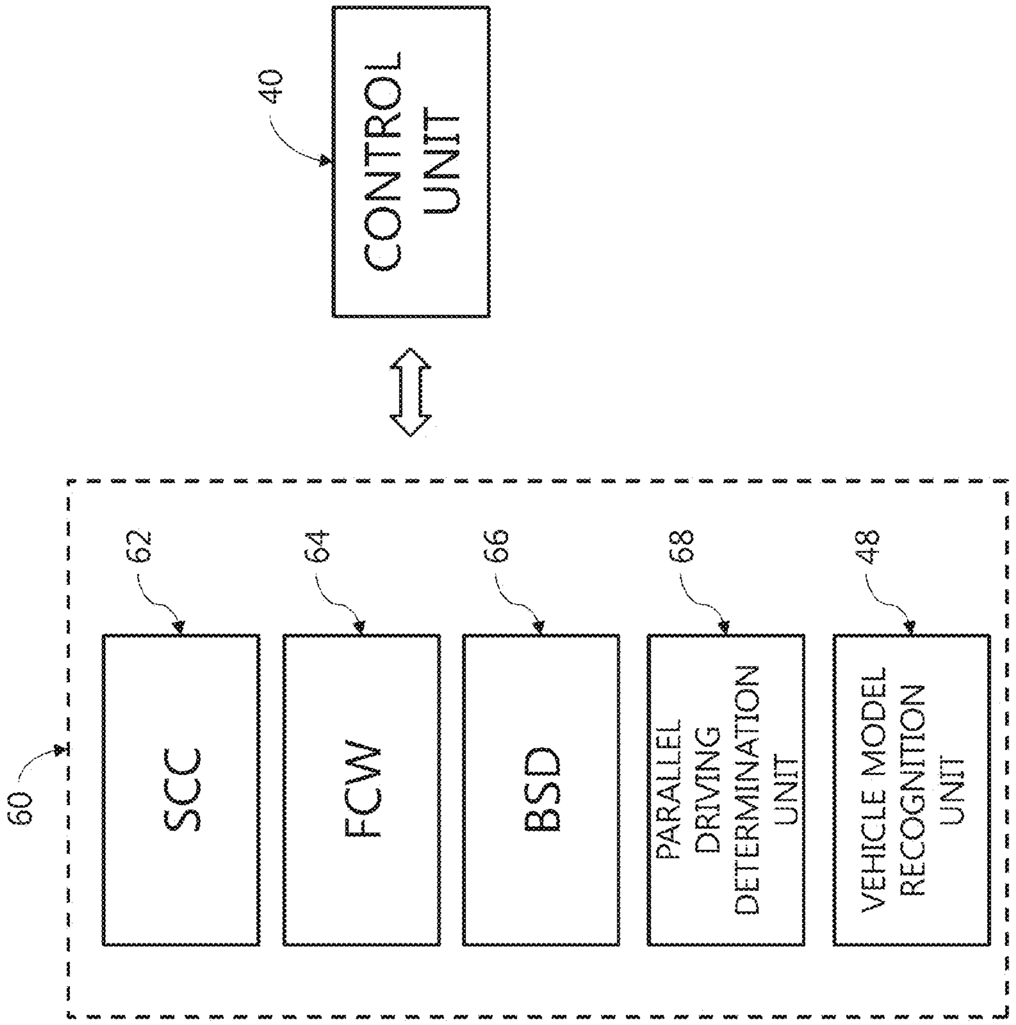
FIG. 9 describes a second vehicle control apparatus using smart cruise control (SCC) systems according to an exemplary embodiment of the present invention.

FIG. 9 describes a second vehicle control apparatus using smart cruise control (SCC) systems. As shown, the second vehicle control apparatus may be provided for controlling a vehicle including a smart cruise control (SCC) system 62. The first vehicle control apparatus may include a controller 40, a blind spot detection (BSD) device 66, and a parallel driving determination unit 68. The controller 40 may be configured to operate the BSD device 66 and the parallel driving determination unit 68. Additionally, the controller 40 may be configured to adjust vehicle speed based on the smart cruise control (SCC) system 32.

The blind spot detection (BSD) device 36 may be configured to detect neighboring vehicles located adjacent to the subject vehicle. The parallel driving determination unit 68 may be configured to instruct the controller 40 to adjust the vehicle speed based on a comparison result between the subject vehicle speed and neighboring vehicle speed when the neighboring vehicle meets a particular condition. Further, the in-vehicle electric system 60 may include the smart cruise control (SCC) system 62 and a forward collision warning (FCW) device 64, and so on. As not shown in FIG. 9, in-vehicle electric system 60 may include a rear collision warning (RCW) device, and the like.

Distinguished from the first vehicle control apparatus shown in FIG. 4, the second vehicle control apparatus may include a vehicle model recognition unit 48 configured to recognize a type of neighboring vehicle when the neighboring vehicle meets the particular condition. When the vehicle model recognition unit 48 determines that the height of neighboring vehicle is greater than a predetermined range, the controller 40 instructed by the vehicle model recognition unit 48 may be configured to cease acceleration of vehicle speed. By way of example, when the height of neighboring vehicle is greater than the predetermined range, the vehicle model recognition unit 48 may be configured to classify the neighboring vehicle as a commercial vehicle including a lorry having a long length.

As above described, when detecting a parallel driving, i.e., a situation of blocking other traffic by driving right or left next to another vehicle at the same speed on a multi-lane road, a vehicle ma slow down and speed up automatically to escape from the parallel driving. While being driven on a multi-lane road, a vehicle may provide a defensive driving to prevent side collisions and increase probability to avoid accidents by automatically slowing down and speeding up in response to detecting an adjacent driving vehicle.

The aforementioned embodiments are achieved by combination of structural elements and features of the invention in a predetermined manner. Each of the structural elements or features should be considered selectively unless specified separately. Each of the structural elements or features may be carried out without being combined with other structural elements or features. In addition, some structural elements and/or features may be combined with one another to constitute the exemplary embodiments of the invention. The order of operations described in the exemplary embodiments of the invention may be changed. Some structural elements or features of one exemplary embodiment may be included in another exemplary embodiment, or may be replaced with corresponding structural elements or features of another exemplary embodiment. Moreover, it will be apparent that some claims referring to specific claims may be combined with another claims referring to the other claims other than the specific claims to constitute the embodiment or add new claims by means of amendment after the application is filed.

Various exemplary embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet).

It will be apparent to those skilled in the art that various modifications and variations can be made in the invention without departing from the spirit or scope of the inventions. Thus, it is intended that the invention covers the modifications and variations of this invention provided they come within the scope of the appended claims and their equivalents.

What is claimed is:

1. A method for controlling a subject vehicle including a smart cruise control (SCC) system, comprising:

providing driving under a smart cruise control (SCC) system;

determining whether a neighboring vehicle sensed by a blind spot detection (BSD) device or an imaging device a particular condition;

adjusting the speed of the subject vehicle based on a comparison result between the subject vehicle speed and neighboring vehicle speed when the neighboring vehicle meets the particular condition; and reinstating the subject vehicle speed when an abort condition is met, wherein the abort condition includes at least one selected from the group consisting of:

a first abort condition in which the neighboring vehicle is over at least 10 meters away from the subject vehicle, a second abort condition in which a distance between the neighboring vehicle and the subject vehicle is greater than a safe distance from vehicles ahead or behind, predetermined by the smart cruise control (SCC) system, and a third abort condition in which the adjustment of the subject vehicle speed is continuously performed over at least 5 seconds.

2. The method according to claim 1, further comprising:

determining whether the subject vehicle speed is equal to or greater than a reference speed.

3. The method according to claim 1, wherein the particular condition includes:

a first condition regarding a distance between the subject vehicle and the neighboring vehicle; and a second condition regarding a relative velocity between the subject vehicle and the neighboring vehicle.

4. The method according to claim 3, wherein the first condition is that the distance is less than 4 meters and the second condition is that the relative velocity is less than ±3 km/h.

5. The method according to claim 4, wherein the particular condition further includes:

a third condition that the first and second conditions are maintained over at least 1 second.

6. The method according to claim 1, wherein the adjusting of the subject vehicle speed includes:

speeding up the subject vehicle when the subject vehicle speed is greater than the neighboring vehicle speed; and slowing down the subject vehicle when the subject vehicle speed is less than the neighboring vehicle speed.

7. The method according to claim 6, wherein the subject vehicle speed is adjusted by about 2 km/h at a time.

8. The method according to claim 1, further comprising: recognizing a type of neighboring vehicle when the neighboring vehicle meets the particular condition.

9. The method according to claim 8, further comprising: classifying, the neighboring vehicle as a commercial vehicle when a height of the neighboring vehicle is greater than a predetermined range, and ceasing acceleration of the subject vehicle speed.

10. An apparatus for controlling a subject vehicle including a smart cruise control (SCC) system, the apparatus comprising:
- a controller configured to adjust the speed of the subject vehicle based on the smart cruise control (SCC) system;
- a blind spot detection (BSD) device or an imaging device configured to detect a neighboring vehicle located adjacent to the subject vehicle; and
- a parallel driving determination unit configured to instruct the controller to adjust the subject vehicle speed based on a comparison result between the subject vehicle speed and neighboring vehicle speed when the neighboring vehicle meets a particular condition, and to reinstate the subject vehicle speed when an abort condition is met,
- wherein the abort condition includes at least one selected from the group consisting of:
- a first abort condition in which the neighboring vehicle is over at least 10 meters away from the subject vehicle,
- a second abort condition in which a distance between the neighboring vehicle and the subject vehicle is greater than a safe distance from vehicles ahead or behind, predetermined by the smart cruise control (SCC) system, and
- a third abort condition in which the adjustment of the subject vehicle speed is continuously performed over at least 5 seconds.

11. The apparatus according to claim 10, wherein the parallel driving determination unit is configured to determine whether the neighboring vehicle meets the particular condition when the subject vehicle speed is equal to or greater than a reference speed based on a location of the subject vehicle.

12. The apparatus according to claim 11, wherein the particular condition includes:
- a first condition regarding a distance between the subject vehicle and the neighboring vehicle;
- a second condition regarding a relative velocity between the subject vehicle and the neighboring vehicle; and
- a third condition that the first and second conditions are maintained over at least 1 second.

13. The apparatus according to claim 12, wherein the first condition is that the distance is less than 4 meters and the second condition is that the relative velocity is less than 3 km/h.

14. The apparatus according to claim 10, wherein the parallel driving determination unit is configured to speed up the subject vehicle when the subject vehicle speed is greater than the neighboring vehicle speed, and slow down the subject vehicle when the subject vehicle speed is less than the neighboring vehicle speed.

15. The apparatus according to claim 13, wherein the subject vehicle speed is adjusted by about 2 km/h at a time.

16. The apparatus according to claim 10, further comprising:
- a vehicle model recognition unit configured to recognize a type of neighboring vehicle when the neighboring vehicle meets the particular condition.

17. The apparatus according to claim 16, wherein, when a height of the neighboring vehicle is greater than a predetermined range, the controller is configured to cease acceleration of the subject vehicle speed.

18. An apparatus for controlling a subject vehicle including a smart cruise control (SCC) system comprising a processing system that comprises at least one data processor and at least one non-transitory computer-readable memory storing a computer program, wherein the processing system is configured to cause the apparatus to:
- drive on the smart cruise control (SCC) system;
- determine whether a speed of the subject vehicle is equal to or greater than a reference speed based on a location of the subject vehicle;
- determine whether a neighboring vehicle sensed by a blind spot detection (BSD) device or an imaging device meets a particular condition;
- adjust the speed of the subject vehicle based on a comparison result between the subject vehicle speed and neighboring vehicle speed when the neighboring vehicle meets the particular condition; and
- reinstating the subject vehicle speed when an abort condition is met,
- wherein the abort condition includes at least one selected from the group consisting of:
- a first abort condition in which the neighboring vehicle is over at least 10 meters away from the subject vehicle,
- a second abort condition in which a distance between the neighboring vehicle and the subject vehicle is greater than a safe distance from vehicles ahead or behind, predetermined by the smart cruise control (SCC) system, and
- a third abort condition in which the adjustment of the subject vehicle speed is continuously performed over at least 5 seconds.

19. The apparatus according to claim 18, wherein the processing system is further configured to cause the apparatus to determine whether the subject vehicle speed is equal to or greater than a reference speed.

20. The apparatus according to claim 18, wherein the particular condition includes:
- a first condition regarding a distance between the subject vehicle and the neighboring vehicle;
- a second condition regarding a relative velocity between the subject vehicle and the neighboring vehicle; and
- a third condition that the first and second conditions are maintained over at least 1 second.

* * * * *